US012774381B2

(12) United States Patent
Nguyen et al.

(10) Patent No.: US 12,774,381 B2
(45) Date of Patent: Oct. 27, 2026

(54) SOLID SURFACE COMPOSITION COMPRISING RECYCLED SOLID SURFACE PARTICLES

(71) Applicant: DUPONT SAFETY & CONSTRUCTION, INC., Wilmington, DE (US)

(72) Inventors: Thi Hoang Ha Nguyen, East Amherst, NY (US); Keith William Pollak, Youngstown, NY (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 633 days.

(21) Appl. No.: 18/221,129

(22) Filed: Jul. 12, 2023

(65) Prior Publication Data

US 2024/0043677 A1 Feb. 8, 2024

Related U.S. Application Data

(60) Provisional application No. 63/395,171, filed on Aug. 4, 2022.

(51) Int. Cl.

| | |
|---|---|
| ***C08L 33/04*** | (2006.01) |
| ***C08J 3/02*** | (2006.01) |
| ***C08J 3/20*** | (2006.01) |
| ***C08J 11/06*** | (2006.01) |
| ***C08K 3/22*** | (2006.01) |

(52) U.S. Cl.

CPC ................ *C08L 33/04* (2013.01); *C08J 3/02* (2013.01); *C08J 3/203* (2013.01); *C08J 11/06* (2013.01); *C08K 3/22* (2013.01); *C08J 2333/04* (2013.01); *C08J 2467/06* (2013.01); *C08K 2003/2227* (2013.01); *C08K 2201/005* (2013.01); *C08L 2207/20* (2013.01)

(58) Field of Classification Search

USPC ........................................................ 521/40.5

See application file for complete search history.

(56) References Cited

U.S. PATENT DOCUMENTS

| | | | |
|---|---|---|---|
| 3,847,865 | A | 11/1974 | Duggins |
| 4,085,246 | A | 4/1978 | Buser et al. |
| 4,204,820 | A | 5/1980 | Toncelli |
| 9,371,425 | B2 | 6/2016 | Rose et al. |
| 10,221,302 | B2 | 3/2019 | Blackman et al. |
| 10,570,280 | B2 | 2/2020 | Pollak et al. |
| 10,927,238 | B2 | 2/2021 | Blackman et al. |
| 2009/0104382 | A1 | 4/2009 | Harel et al. |
| 2018/0319970 | A1 | 11/2018 | Pollak et al. |

FOREIGN PATENT DOCUMENTS

| | | | |
|---|---|---|---|
| CN | 102838321 | A | 12/2012 |
| JP | 2009242626 | A | 10/2009 |
| KR | 101267653 | B1 | 5/2013 |
| KR | 101581962 | B1 | 12/2015 |

OTHER PUBLICATIONS

PCT International Search Report for Application No. PCT/US2023/027506; Graham Russell, Authorized Officer; ISA/EPO; Oct. 16, 2023.

*Primary Examiner* — Terressa Boykin

(57) ABSTRACT

A composition, made from recycled solid surface material or articles, that is suitable for making solid surface materials or articles, and a solid surface material or article made therefrom, the composition comprising a matrix resin of unsaturated polyester resin, inorganic filler particles, ground solid surface primary particles, ground solid surface secondary particles, and, optionally, solid surface dust particles. The composition is especially useful in making three-dimensional, rigid-surface, polymeric solid surface material and articles that are free of objectionable surface voids and have a smooth and stable continuous surface.

16 Claims, No Drawings

SOLID SURFACE COMPOSITION COMPRISING RECYCLED SOLID SURFACE PARTICLES

BACKGROUND OF THE INVENTION

Field of the Invention

This invention relates to solid surface materials and articles, particularly materials and articles that are suitable for use as decorative panels, countertops, moldings (such as sinks, etc.), and other uses, that contain solid surface particles that are typically obtained from recycling solid surface materials and articles or other sources that would typically be waste and landfilled.

Description of Related Art

Various publications mention the recycling of material. United States Pat. App. Publication US20090104382 discloses composite stone material that includes recycled composite stone material. The recycled waste products may be crushed to any particle size, such as, for example, in the range of about 0.065 mm to 10 mm.

Korean Pat. App. Pub. KR101267653 discloses an artificial marble made from recycled acrylic chips, having in combination acrylic chips having an average particle diameter of 2 to 40 mm with acrylic chips having a thickness of 5 to 20 mm are added of 5 mm or more.

Korean Pat. App. Pub. KR101581962 discloses a method and apparatus for manufacturing artificial stone, made by mixing two or more kinds of chips of different particle sizes. Chips having a particle size of 3 mm to 9 mm and chips having a particle size of 1 mm to 3 mm are mentioned.

Chinese Pat. App. Publication CN102838321 discloses construction waste recycled artificial marble and preparation method thereof, made with the following components by weight: 30-70% of construction waste dust, 10-50% of construction waste recycled fine aggregate, 10-40% of unsaturated polyester resin, 2-15% of accelerant, 0.5-4% of curing agent, 0.3-4% of acrylic paint and 0.2-4% of aluminum hydroxide.

Consumers today appreciate and desire materials that contain some amount of recycled material, particularly recycled material that is considered post-consumer waste, which is waste produced by the consumer of a product. Manufacturers also desire to recycle waste produced during the manufacture of products. Recycling of both these types of waste helps to lessen the amount of material that must be landfilled, therefore lessening the impact building materials have on the environment.

Three dimensional, rigid-surface polymeric solid materials and articles, known as solid surface material and articles, are sold in many forms including slabs or panels, and are suitable for use as kitchen countertops, sinks, wall coverings, various moldings, and other uses. Solid surface materials are generally composite materials comprising a polymeric matrix and one or more fillers, including inorganic fillers.

Since solid surface materials typically have filler particles, it was thought that one potential route for recycling scraps of solid surface material was to grind solid surface pieces into particles and then use those particles as a filler, combining those particles with polymeric resin in the making of solid surface material or article. Such materials and articles are especially desirable when they contain high loadings (50 weight percent or greater) of recycled solid surface materials. However, such recycled material from post-consumer and manufacturing waste comprises many different particle sizes, including a fair amount of smaller (<1 mm) particles. It has been found that acceptable solid surface materials and articles were not obtained when the composition for making solid surface material contained high loadings of such recycled solid surface particles, especially when a fair amount of the smaller (<1 mm) particles were present in the composition. It is believed these smaller particles interact with each other and result in solid surface material having unacceptable surface voids and/or a surface that was rough to the touch and/or unstable (crumble-like).

Therefore, what is needed are compositions for making solid surface material and articles having acceptable surface characteristics that contain recycled solid surface particles, preferably at high loadings, that additionally include a fair amount of smaller (<1 mm) particles.

BRIEF SUMMARY OF THE INVENTION

This invention relates to a composition suitable for making a solid surface material or article, comprising:

a) 15 to 25 weight percent ($X_R$) of unsaturated polyester resin, b) 15 to 50 weight percent ($X_A$) ground solid surface primary particles having a particle size that can pass through a mesh screen having 4.76 mm openings but not through a mesh screen having 0.150 mm openings, wherein at least 70 weight percent of the ground solid surface primary particles will not pass through a mesh screen having 0.60 mm openings, and c) 30 to 70 weight percent ($X_B$) of fine particles, wherein the c) particles include:

i) 2 to 25 weight percent ($X_C$) ground solid surface secondary particles having a particle size that can pass through a mesh screen having 0.60 mm openings but not through a mesh screen size having 0.075 mm openings, wherein at least 90 weight percent of the ground solid surface secondary particles will not pass through a mesh screen having 0.105 mm openings, ii) 5 to 35 weight percent ($X_F$) of inorganic filler particles, and iii) 0 to 23 weight percent ($X_D$) solid surface dust particles having a particle size that can pass through a mesh screen having 0.150 mm openings, wherein at least 60 weight percent of the solid surface dust particles will also pass through a mesh screen having 0.105 mm openings;

wherein the lower limit of weight percent ($X_C$) ground solid surface secondary particles is further represented by the expression:

$$-0.40X_R+0.11+\frac{(0.30X_R+0.01)}{1+e^{-[(X_B-1.40X_R-0.25)/(0.04X_R+0.004)]}}$$

and the upper limit of weight percent ($X_C$) ground solid surface secondary particles is further represented by the expression:

$$0.20X_R+0.05+\frac{(1.7X_R-0.195)}{1+e^{-[(X_B+2.60X_R-0.85)/(0.60X_R-0.08)]}},$$

wherein the lower limit of weight percent ($X_F$) of inorganic filler particles is further represented by the expression:

$$-0.40X_R + 0.13 + \frac{(X_R + 0.10)}{1 + e^{-[(X_B - 3.60X_R + 0.21)/(-0.60X_R + 0.14)]}}$$

and the upper limit of weight percent ($X_F$) of inorganic filler particles is further represented by the expression:

$$0.3 + \frac{(-0.42X_R + 0.14)}{1 + e^{-[(X_B + 1.60X_R - 0.77)/(0.56X_R - 0.07)]}},$$

and wherein if solid surface dust particles are present, the lower limit of weight percent ($X_D$) solid surface dust particles is further represented by the expression:

$$\frac{(-0.84X_R + 0.168)}{1 + e^{-[(X_B - 0.38X_R - 0.39)/(0.01X_R)]}}$$

and the upper limit of weight percent ($X_D$) of solid surface dust particles is further represented by the expression:

$$4.36X_R - 0.62 + \frac{(-4.00X_R + 0.66)}{1 + e^{-[(X_B + 1.54X_R - 0.69)/(0.68X_R - 0.10)]}}.$$

This invention also relates to a method for making a solid surface material or article, comprising the steps of:

A) grinding a solid surface article to form a mixture of solid surface particles;

B) classifying the particles into a set of classified particles comprising

I) ground solid surface primary particles having a particle size that can pass through a mesh screen having 4.76 mm openings but not through a mesh screen having 0.150 mm openings, wherein at least 70 weight percent of the ground solid surface primary particles will not pass through a mesh screen having 0.60 mm openings, and II) ground solid surface secondary particles having a particle size that can pass through a mesh screen having 0.60 mm openings but not through a mesh screen size having 0.075 mm openings, wherein at least 90 weight percent of the ground solid surface secondary particles will not pass through a mesh screen having 0.105 mm openings;

C) combining liquid unsaturated polyester resin with particles chosen from the classified set of particles, along with inorganic filler particles, to form a composition for forming a solid surface article; and D) molding the composition into a solid surface article.

DETAILED DESCRIPTION OF THE INVENTION

This invention relates to a composition suitable for making a solid surface material or article, and comprises a matrix resin of unsaturated polyester resin, inorganic filler particles, ground solid surface primary particles, and ground solid surface secondary particles. The composition can optionally also contain solid surface dust particles. The composition is especially useful in making three-dimensional, rigid-surface, polymeric solid surface material and articles that are free of objectionable surface voids and have a smooth and stable continuous surface.

The composition comprises 15 to 25 weight percent matrix resin of unsaturated polyester resin, 15 to 50 weight percent ground solid surface primary particles, and 30 to 70 weight percent fine particles. The 30 to 70 weight percent fine particles are distributed as follows; 2 to 25 weight percent are ground solid surface secondary particles, 5 to 35 weight percent are inorganic filler particles, and 0 to 23 weight percent are solid surface dust particles; with the amounts of fine particles further lying between certain upper and lower limits as described by a series of equations relating the upper and lower amounts of each smaller particle. In some preferred embodiments, all of fine particles will pass through a mesh screen having 0.105 mm openings.

In some embodiments, the combined amounts of ground solid surface primary particles, ground solid surface secondary particles, and optional solid surface dust particles comprise greater than 50 weight percent of the composition. In some embodiments, the combined amounts of ground solid surface primary particles, ground solid surface secondary particles, and solid surface dust particles comprise up to 85 weight percent of the composition.

Specifically, this invention relates to a composition suitable for making a solid surface material or article, and a solid surface material or article made from said composition, the composition comprising:

a) 15 to 25 weight percent ($X_R$) of unsaturated polyester resin, b) 15 to 50 weight percent ($X_A$) ground solid surface primary particles having a particle size that can pass through a mesh screen having 4.76 mm openings but not through a mesh screen having 0.150 mm openings, wherein at least 70 weight percent of the ground solid surface primary particles will not pass through a mesh screen having 0.60 mm openings, and c) 30 to 70 weight percent (X B) of fine particles, wherein the c) particles include:

i) 2 to 25 weight percent ($X_C$) ground solid surface secondary particles having a particle size that can pass through a mesh screen having 0.60 mm openings but not through a mesh screen size having 0.075 mm openings, wherein at least 90 weight percent of the ground solid surface secondary particles will not pass through a mesh screen having 0.105 mm openings, ii) 5 to 35 weight percent ($X_F$) of inorganic filler particles, and iii) 0 to 23 weight percent ($X_D$) solid surface dust particles having a particle size that can pass through a mesh screen having 0.150 mm openings, wherein at least 60 weight percent of the solid surface dust particles will also pass through a mesh screen having 0.105 mm openings.

Additionally, within the bounds described above, the inventors have found that the different-sized particles in the composition can interact in a non-linear fashion. In particular, it has been found that solid surface materials and articles having the most acceptable surface characteristics are obtained when the individual amounts of the smaller particles (ground solid surface secondary particles, optional solid surface dust particles, and inorganic filler particles) further lie between certain upper and lower limits as described by a series of equations relating the upper and lower amounts of each smaller particle to the amount of resin ($X_R$) and the total amount of fine particles ($X_B$); with ($X_B$) equal to the sum of ($X_C$), ($X_F$), and ($X_D$).

Specifically, acceptable solid surface materials and articles result when the weight percent ($X_C$) ground solid surface secondary particles in the composition are broadly bounded by the range of 2 to 25 weight percent, the weight percent ($X_C$) being further between a calculated upper limit and lower limit that adjusts the amount for compositional interactions; the lower limit of weight percent ($X_C$) of ground solid surface secondary particles being represented by the expression:

$$-0.40X_R+0.11+\frac{(0.30X_R+0.01)}{1+e^{-[(X_B-1.40X_R-0.25)/(0.04X_R+0.004)]}}$$

and the upper limit of weight percent ($X_C$) ground solid surface secondary particles being represented by the expression:

$$0.20X_R+0.05+\frac{(17X_R-0.195)}{1+e^{-[(X_B+2.60X_R-0.85)/(0.60X_R-0.08)]}}.$$

The weight percent ($X_F$) of inorganic filler particles in the composition are broadly bounded by the range of 5 to 35 weight percent, and the weight percent ($X_F$) being further between a calculated upper limit and lower limit that adjusts the amount for compositional interactions; the lower limit of weight percent ($X_F$) of the inorganic filler particles being represented by the expression:

$$-0.40X_R+0.13+\frac{(X_R+0.10)}{1+e^{-[(X_B-3.60X_R+0.21)/(-0.60X_R+0.14)]}}$$

and the upper limit of weight percent ($X_F$) of the inorganic filler particles being represented by the expression:

$$0.3+\frac{(-0.42X_R+0.14)}{1+e^{-[(X_B+1.60X_R-0.77)/(0.56X_R-0.07)]}}.$$

While solid surface dust particles are optional components in the composition, the weight percent ($X_D$) solid surface dust particles in the composition are broadly bounded by the range of 0 to 23 weight percent, and the weight percent ($X_D$) being further between a calculated upper limit and lower limit that adjusts the amount for compositional interactions; the lower limit of weight percent ($X_D$) of the solid surface dust particles being represented by the expression:

$$\frac{(-0.84X_R+0.168)}{1+e^{-[(X_B-0.38X_R-0.39)/(0.01X_R)]}}$$

and the upper limit of weight percent ($X_D$) of the solid surface dust particles being represented by the expression:

$$4.36X_R-0.62+\frac{(-4.00X_R+0.66)}{1+e^{-[(X_B+1.54X_R-0.69)/(0.68X_R-0.10)]}}.$$

Matrix Resin

The composition contains 15 to 25 weight percent ($X_R$) of unsaturated polyester (UPE) resin as a matrix resin. UPE resins comprise polyester polymers or copolymers that incorporate covalently bound unsaturation, like a carbon-carbon double bond, dissolved in polymerizable styrenic monomers, like styrene. In some embodiments, the unsaturated polyester resin consists essentially of polyester polymers or copolymers.

In some embodiments, the unsaturated polyester resin used in the composition comprises about a 25 to 90 volume fraction percent unsaturated polyester and 10 to 75 volume fraction percent of a monomer, wherein 100% of the monomer is styrene or the monomer is a blend of styrene and methyl methacrylate at any ratio.

Inorganic Filler

The composition comprises 5 to 35 weight percent ($X_F$) inorganic filler particles. An inorganic filler particle is any material that is solid at room temperature and atmospheric pressure and is not chemically decomposed by the various ingredients of the composition and is insoluble in these ingredients, even when these ingredients are raised to a temperature above room temperature, and in particular in a curing oven due to the exothermic cure chemistry. Preferably, inorganic filler particles are distributed uniformly throughout the composition and any solid surface material or article made from the composition.

In one embodiment, the inorganic filler particles have a particle size that can pass through a mesh screen having 0.088 mm openings.

In some preferred embodiments, the inorganic filler particle comprises alumina trihydrate (ATH). A calcined ATH prepared by a thermal treatment process to remove water is particularly suitable. In other embodiments, the inorganic filler particle is alumina, talc or quartz.

Alumina trihydrate (ATH) is a preferred inorganic filler, in that ATH matches the refractive index properties of the matrix resin, providing a more aesthetically-pleasing appearance. The use of ATH as the filler also allows the final solid surface material to be cut and worked similar to wood, something that is generally not possible if harder fillers are used.

The inorganic filler particles in the composition and the amounts thereof refer to inorganic filler particles intentionally added to the composition; that is, it is intended that inorganic filler particles be considered additional to and separate from any residual filler present in the ground solid surface primary and secondary particles or solid surface dust particles.

Solid Surface Particles

The composition comprises 15 to 50 weight percent ($X_A$) ground solid surface primary particles and 2 to 25 weight percent ($X_C$) ground solid surface secondary particles. The ground solid surface primary and secondary particles in the composition are obtained by cutting, masticating, and/or grinding scrap solid surface material or articles into particles. Typically, the scrap solid surface is obtained at such places as manufacturing sites, fabricators of solid surface articles, and from end-of-life demolitions of buildings. It is believed scrap solid surface material or articles can be processed into particles using any convenient milling or grinding process.

The ground solid surface primary particles have a distribution of particle sizes, the distribution having a particle size that can pass through a mesh screen having 4.76 mm openings but not through a mesh screen having 0.150 mm openings, and at least 70 weight percent of the ground solid surface primary particles will not pass through a mesh screen having 0.60 mm openings.

The ground solid surface secondary particles have a distribution of particle sizes, the distribution having a particle size that can pass through a mesh screen having 0.60 mm openings but not through a mesh screen size having 0.075 mm openings, and at least 90 weight percent of the ground solid surface secondary particles will not pass through a mesh screen having 0.105 mm openings, The ground solid surface primary and secondary particles generally comprise a matrix polymer and a residual filler material such as was contained in the recycled solid surface material or article. This residual filler material can be an inorganic filler as previously described herein, particularly alumina trihydrate as previously described. However, for the purpose of establishing amounts of materials in the composition, any amount of residual filler material in the solid surface primary and secondary particles or solid surface dust is not considered "inorganic filler particles" as described herein.

In some embodiments, the matrix polymer of the ground solid surface primary and secondary particles is an acrylic polymer, and in some embodiments the acrylic polymer comprises polymethylmethacrylate. In some embodiments, the ground solid surface primary and secondary particles comprise a mixture of polymethylmethacrylate and unsaturated polyester polymer.

Solid Surface Dust Particles

The optional solid surface dust particles used in the composition are particles having a distribution of particle sizes, the distribution having a particle size that can pass through a mesh screen having 0.150 mm openings, wherein at least 60 weight percent of the solid surface dust particles will also pass through a mesh screen having 0.105 mm openings. The solid surface dust particles are typically generated by wet cutting and sanding operations on solid surface materials and articles. The very fine particles that are generated can be recovered by filtering the wet cutting and sanding processing water, followed by drying the filter cake captured on the filter. Therefore, solid surface dust particles can comprise the matrix polymer(s) and residual inorganic filler material previously described for the ground solid surface primary and secondary particles and can also contain material added during the particle recovery process, such as small quantities of filter aid or flocculant. In some embodiments, the solid surface dust particles are unground particles. In some embodiments, the solid surface dust particles can include very fine ground particles that are not suitable, due to their small size, as ground solid surface primary and secondary particles.

Solid Surface

The matrix resin of unsaturated polyester resin, inorganic filler particles, ground solid surface primary particles, ground solid surface secondary particles, and optional solid surface dust particles can be then mixed together to form a flowable sand-like composition suitable for making a solid surface material or article. The solid surface material can then be made as described in U.S. Pat. No. 3,847,865 to Duggins or U.S. Pat. No. 4,085,246 to Buser et al.

Acceptable solid surface materials and articles can be made from the composition containing recycled material, as described herein, using conventional casting and molding processes; however, the inventors have found that some processes have difficulty handling more than 30 weight percent recycled material. Above that amount, the composition has a very high viscosity and has difficulty flowing and settling in the mold, and acceptable solid surface material requires excessive attention.

The inventors have found that acceptable solid surface materials and articles can be made with compositions containing greater than 50 weight percent recycled material if the solid surface is made by a vibro-compression or vibro-compaction processes such as described in U.S. Pat. No. 4,204,820 and/or Italian Pat. Publication IT1056388 to Toncelli. These types of processes include steps wherein the composition is placed in a mold and compressed under vacuum with vibration, followed by transferring the composition in the mold to an oven where the compacted composition is then cured into a solid surface material or article. The cured solid surface material or article, generally in slab form, is then removed from the oven and can be further processed (e.g., trimming edges and polishing the surface) as desired to make a finished solid surface material or article.

Method for Making

This invention also relates to a method for making a solid surface material or article, and a solid surface material or article made thereby, the method comprising the steps of:

A) grinding a solid surface article to form a mixture of solid surface particles;

B) classifying the particles into a set of classified particles comprising

I) ground solid surface primary particles having a particle size that can pass through a mesh screen having 4.76 mm openings but not through a mesh screen having 0.150 mm openings, wherein at least 70 weight percent of the ground solid surface primary particles will not pass through a mesh screen having 0.60 mm openings, and II) ground solid surface secondary particles having a particle size that can pass through a mesh screen having 0.60 mm openings but not through a mesh screen size having 0.075 mm openings, wherein at least 90 weight percent of the ground solid surface secondary particles will not pass through a mesh screen having 0.105 mm openings;

C) combining liquid unsaturated polyester resin with particles chosen from the classified set of particles, along with inorganic filler particles, to form a composition for forming a solid surface article; and D) molding the composition into a solid surface article.

It is believed the grinding step A) can be conducted via many different types of size-reduction equipment, including such equipment as hammer mills, disk mills, roll mills, and the like. If desired, various pieces of equipment can be combined to cut, masticate, and/or grind scrap solid surface material or articles into the desired particles.

It is further believed that any industrial method of sieving particles using screens can be used in the classifying step B). A typical method of sieving particles uses a column of sieve trays of wire mesh screens of a graded mesh size. The particles to be classified are poured onto the top sieve tray which has the largest screen openings. Each lower sieve tray in the column has smaller openings than the one above.

The column of sieves trays is typically placed in a mechanical shaker, which shakes all the sieve trays in the column to facilitate movement of the particles on the surface of each mesh screen in each tray so that particles small enough to fit through the screen openings can fall through to the next sieve tray by gravity. After the shaking is complete, the particles remaining on each mesh screen of each sieve tray have a particle size too large to pass through the openings in that mesh screen. Therefore, the classifying step B) takes a distribution of particle sizes and separates those particles into certain size cuts of each particle size, each cut having a size that passes through a mesh screen having larger openings but not passing through a mesh screen having smaller openings. In some embodiments, the column of sieve trays has multiple sieve trays, with each sieve tray having a screen mesh having a set opening dimension.

While there are various systems of identifying the mesh sizes such as US Standard or Tyler mesh, herein any screen sizes are identified by their openings in millimeters to avoid confusion. Additionally, as used herein, the openings in the screen are assumed to be square openings; for example, a mesh screen having 0.150 mm openings has openings that are square, and each side of the square opening is nominally 0.150 mm.

Preferably the column of sieve trays comprises at least 5 sieve trays, each sieve tray having a different size opening, with the sieve trays ordered from the screen having the largest openings on top, followed by the next largest, and so forth; a pan is used to collect any particles that pass through all the screens. In some embodiments, the screen mesh openings in the tray column range from about 4.76 mm to 0.075 mm. Nominal representative screen mesh openings for classifying particles can include 4.76 mm, 0.6 mm, 0.150 mm, 0.105 mm, 0.088 mm and 0.075 mm.

The step C) of combining the unsaturated polyester resin with the particles to make a suitable composition for making a solid surface material or article can be accomplished using methods such as described in U.S. Pat. No. 3,847,865 to Duggins or U.S. Pat. No. 4,085,246 to Buser et al.

In some embodiments, step C) of combining the unsaturated polyester resin with the particles can be accomplished by first combining the resin with various desired additives, typically other liquid components such as a coupling agent and/or catalyst, followed by mixing to form a resin mixture. Separately, the primary and secondary particles are combined and mixed; and then resin mixture can be added to this particle mixture and mixed until a uniform mixture is achieved. At this point, the inorganic filler can be added, along with any solid surface dust particles if the composition is to include such particles, and the entire mixture further mixed until all the materials are adequately dispersed as desired and the mixture has the consistency of wet sand.

In some embodiments, the method for making a solid surface material or article uses a composition in step C) that contains greater than 50 weight percent particles chosen from the classified set of particles.

In some embodiments of the method, step C) includes combining solid surface dust particles in the composition for forming a solid surface article, the solid surface dust particles having a particle size that can pass through a mesh screen having 0.150 mm openings, wherein at least 60 weight percent of the solid surface dust particles will also pass through a mesh screen having 0.105 mm openings.

In some embodiments, the method for making a solid surface material or article uses a composition in step C) wherein the combined amounts particles chosen from the ground solid surface primary particles, ground solid surface secondary particles, and solid surface dust particles, comprise greater than 50 weight percent of the composition. In still other embodiments, the method for making a solid surface material or article uses a composition containing up to 85 weight percent particles chosen from the combined amounts of the ground solid surface primary particles, ground solid surface secondary particles, and solid surface dust particles.

In some embodiments, the method for making a solid surface material or article uses a composition in step C) containing 15 to 25 weight percent of the liquid polyester resin.

In some embodiments, the method for making a solid surface material or article uses a composition in step C) comprising 15 to 25 weight percent matrix resin of unsaturated polyester resin, 15 to 50 weight percent ground solid surface primary particles, and 30 to 70 weight percent fine particles. The 30 to 70 weight percent fine particles are distributed as follows; 2 to 25 weight percent are ground solid surface secondary particles, 5 to 35 weight percent are inorganic filler particles, and 0 to 23 weight percent are solid surface dust particles. Preferably, all of fine particles will pass through a mesh screen having a 1 mm opening.

In some embodiments, the method for making a solid surface material or article uses a composition in step C) that deals with non-linear particle interactions, as previously described herein, to make the most acceptable surface characteristics. Specifically, in some embodiments, the method for making a solid surface material or article uses a composition in step C) that comprises:

a) 15 to 25 weight percent ($X_R$) of unsaturated polyester resin,
b) 15 to 50 weight percent ($X_A$) ground solid surface primary particles, and
c) 30 to 70 weight percent ($X_B$) of fine particles wherein the c) particles include:

i) 2 to 20 weight percent ($X_D$) ground solid surface secondary particles,
ii) 5 to 35 weight percent ($X_F$) of inorganic filler particles, and
iii) 0 to 23 weight percent ($X_D$) solid surface dust particles having a particle size that can pass through a mesh screen having 0.150 mm openings, wherein at least 60 weight percent of the solid surface dust particles will also pass through a mesh screen having 0.105 mm openings.

Additionally, within the bounds described in a) to c) and i) to iii) provided above, and previously described herein, the inventors have found that the different-sized particles in the composition can interact in a non-linear fashion and that solid surface materials and articles having the most acceptable surface characteristics are obtained when the individual amounts of the smaller particles (ground solid surface secondary particles, optional solid surface dust particles, and inorganic filler particles) further lie between certain upper and lower limits as described by a series of equations relating the upper and lower amounts of each smaller particle to the amount of resin ($X_R$) and the total amount of fine particles ($X_B$); with ($X_B$) equal to the sum of ($X_C$), ($X_F$), and ($X_D$).

Specifically, acceptable solid surface materials and articles result when the weight percent ($X_C$) ground solid surface secondary particles in the composition are broadly bounded by the range of 2 to 25 weight percent, the weight percent ($X_C$) being further between a calculated upper limit and lower limit that adjusts the amount for compositional interactions; the lower limit of weight percent ($X_C$) of ground solid surface secondary particles being represented by the expression:

$$-0.40X_R + 0.11 + \frac{(0.30X_R + 0.01)}{1 + e^{-[(X_B - 1.40X_R - 0.25)/(0.04X_R + 0.004)]}}$$

and the upper limit of weight percent ($X_C$) of ground solid surface secondary particles being represented by the expression:

$$0.20\ X_R + 0.05 + \frac{(1.70\ X_R - 0.01)}{-[(X_B + 2.60\ X_R - 0.85)/(0.60\ X_R - 0.08)]1 + e},$$

The weight percent ($X_F$) of inorganic filler particles in the composition are broadly bounded by the range of 5 to 35 weight percent, and the weight percent ($X_F$) being further between a calculated upper limit and lower limit that adjusts the amount for compositional interactions; the lower limit of weight percent ($X_F$) of the inorganic filler particles being represented by the expression:

$$-0.40X_R + 0.13 + \frac{(X_R + 0.10)}{1 + e^{-[(X_B - 3.60X_R + 0.21)/(-0.60X_R + 0.14)]}}$$

and the upper limit of weight percent ($X_F$) of inorganic filler particles being represented by the expression:

$$0.3 + \frac{(-0.42X_R + 0.14)}{1 + e^{-[(X_B + 1.60X_R - 0.77)/(0.56X_R - 0.07)]}},$$

While solid surface dust particles are optional components in the composition, the weight percent ($X_D$) solid surface dust particles in the composition are broadly bounded by the range of 0 to 23 weight percent, and the weight percent ($X_D$) being further between a calculated upper limit and lower limit that adjusts the amount for compositional interactions; the lower limit of weight percent ($X_D$) of the solid surface dust particles being represented by the expression:

$$\frac{(-0.84X_R + 0.168)}{1 + e^{-[(X_B - 0.38X_R - 0.39)/(0.01X_R)]}}$$

and the upper limit of weight percent ($X_D$) of solid surface dust particles being represented by the expression:

$$4.36X_R - 0.62 + \frac{(-4.00X_R + 0.66)}{1 + e^{-[(X_B + 1.54X_R - 0.69)/(0.68X_R - 0.10)]}}.$$

In some embodiments, the method for making a solid surface material or article uses a composition in step C) that comprises inorganic filler particles have a particle size that can pass through a mesh screen having 0.088 mm openings.

The composition made in step C) is then preferably poured or otherwise transferred into a mold to make slabs or other articles of the solid surface material containing recycled material.

In some embodiments, molding in step D) of the composition is conducted under heat and pressure; and in some embodiments methods such as described in U.S. Pat. No. 3,847,865 to Duggins can be used. In some embodiments the method can comprise one or more steps of vibration and/or vacuum, and as previously discussed herein, one preferred method of conducting the molding in step D) is to use a vibro-compression or vibro-compaction process such as described in U.S. Pat. No. 4,204,820 and/or Italian Pat. Publication IT1056388 to Toncelli. These types of processes include steps wherein the composition is placed in a mold, followed by degassing the composition with vacuum in the mold while simultaneously vibrating and compressing the composition. The compacted composition is then cured in an oven to make a solid surface material, generally in slab form, or a solid surface material article.

The amount of vacuum required to de-gas the composition will depend on the actual composition and the type of equipment being used; however, rapid degassing is possible (e.g., less than 2 minutes) using vacuums such as greater than 5 mbar. The composition is molded and compacted generally at room temperature, which is followed by the application of heat, typically from about 80 to 120 C in an oven, to cure the composition into a solid surface material and/or article.

Examples

In the following examples, samples of solid surface were made from compositions containing the following components. The matrix resin was an unsaturated polyester (UPE) resin (Ineos Composites Polaris® resin). The additive components were a coupling agent (Silane A-174) and a peroxide catalyst (Norox® 410-50 OMS). The inorganic filler was Chalco® 15 alumina trihydrate (ATH), which has a particle size range of about 4 to 160 microns and has a D50 of 15 microns.

The primary and secondary particles were particles obtained by grinding and classifying acrylic solid surface. The primary particles had a particle size such that they could pass through a 4.76 mm mesh size screen but not through a 0.150 mm mesh size screen, and 71 weight percent of these particles could not pass through a 0.60 mm mesh size screen. The secondary particles had a particle size such that they could pass through a 0.60 mm mesh size screen but not through a 0.075 mm mesh screen size, and 96 weight percent of these particles could not pass through a 0.105 mm mesh screen size. The solid surface dust particles were small particles obtained from wet cutting and sanding operations and then the captured on a filter as a filter cake, followed by drying, which provided particles having a particle size that can pass through a 0.150 mm mesh size screen and 73 weight percent passed through 0.105 mm mesh screen size.

All of the compositions were made in the following manner in a laboratory using laboratory equipment. The UPE resin and coupling agent were combined and then mixed for 2 minutes, followed by the addition of the catalyst and additional mixing of these liquid components for another 2 minutes. This resin mixture was then set aside. The primary and secondary particles were then combined and mixed for 2 minutes at a mixing speed of 48 hertz. The resin mixture was then added to the combination of primary and secondary particles while mixing at a mixing speed of 15 hertz, then the whole mixture was stirred for an additional 2 minutes at a mixing speed of 48 hertz. The solid surface dust particles and alumina trihydrate were then added to the mixture while mixing at a mixing speed of 15 hertz, followed by mixing an additional 2 minutes at a mixing speed of 48 hertz. Each composition mixture had the consistency of wet sand.

Each composition mixture was then poured into a mold and the mold was placed in a vibro-compaction unit under a vacuum of 9 mbar for 90 seconds while also being pressed in the mold, specifically pressing for 25 seconds under a pressure of 40 psi followed by 65 second under a pressure of 30 psi. The mold was then moved into an oven and cured at 100° C. for 90 min and then allowed to cool to form samples of solid surface materials.

Examples 1-4 were Inventive Examples, while Examples A-D were Comparison Examples, both made from the compositions shown in Table 1 and Table 2.

TABLE 1

| Component | Weight Percent 1 | 2 | 3 | 4 | A | B | C | D |
|---|---|---|---|---|---|---|---|---|
| UPE | 20 | 20 | 20 | 20 | 20 | 17 | 20 | 13 |
| Primary Particles | 37 | 35 | 36 | 47 | 33 | 37 | 34 | 47 |
| Secondary Particles | 17 | 7 | 10 | 7 | 9 | 20 | 20 | 14 |
| Dust | 2.3 | 3.5 | 6 | 13.8 | 21 | 13.8 | 13.8 | 2.3 |
| Filler | 20.7 | 31.5 | 25 | 9.2 | 14 | 9.2 | 9.2 | 20.7 |
| Additives | 3 | 3 | 3 | 3 | 3 | 3 | 3 | 3 |

TABLE 2

| Example | 1 | 2 | 3 | 4 | A | B | C | D |
|---|---|---|---|---|---|---|---|---|
| $X_A$ Range | 0.15-0.50 | 0.15-0.50 | 0.15-0.50 | 0.15-0.50 | 0.15-0.50 | 0.15-0.50 | 0.15-0.50 | 0.15-0.50 |
| $X_A$ | 0.38 | 0.36 | 0.37 | 0.48 | 0.34 | 0.38 | 0.35 | 0.49 |
| $X_B$ Range | 0.30-0.70 | 0.30-0.70 | 0.30-0.70 | 0.30-0.70 | 0.30-0.70 | 0.30-0.70 | 0.30-0.70 | 0.30-0.70 |
| $X_B$ | 0.41 | 0.43 | 0.42 | 0.31 | 0.45 | 0.44 | 0.44 | 0.38 |
| $X_R$ Range | 0.15-0.25 | 0.15-0.25 | 0.15-0.25 | 0.15-0.25 | 0.15-0.25 | 0.15-0.25 | 0.15-0.25 | 0.15-0.25 |
| $X_R$ | 0.21 | 0.21 | 0.21 | 0.21 | 0.21 | 0.18 | 0.21 | 0.13* |
| $X_C$ Range | 0.03-0.23 | 0.03-0.24 | 0.03-0.24 | 0.03-0.16 | 0.03-0.24 | 0.03-0.18 | 0.04-0.24 | 0.06-0.08 |
| $X_C$ | 0.18 | 0.07 | 0.10 | 0.07 | 0.09 | 0.21* | 0.21 | 0.14* |
| $X_D$ Range | 0.00-0.16 | 0.00-0.14 | 0.00-0.15 | 0.00-0.24 | 0.00-0.13 | 0.00-0.11 | 0.00-0.13 | 0.00-0.09 |
| $X_D$ | 0.02 | 0.04 | 0.06 | 0.14 | 0.22* | 0.14* | 0.14* | 0.02 |
| $X_F$ Range | 0.05-0.32 | 0.05-0.33 | 0.05-0.32 | 0.05-0.30 | 0.05-0.33 | 0.24-0.31 | 0.05-0.33 | 0.28-0.30 |
| $X_F$ | 0.21 | 0.32 | 0.26 | 0.10 | 0.14 | 0.10* | 0.10 | 0.21* |
| Result | Good | Good | Good | Good | Poor | Poor | Poor | Poor |

As shown in Table 2, all of the Inventive Examples 1-4 had weight fractions within the broader ranges provided herein, and these weight fractions also were within the upper and lower limits as provided by the equations provided herein; these upper and lower limits compensate for smaller-particle interactions in the composition during molding. Subsequently, samples of solid surface molded from the compositions Examples 1-4 had acceptable surface characteristics, having both a stable and smooth continuous surface without unacceptable surface voids.

Comparison Examples A-D had weight fractions that either were outside the broader ranges provided herein or these weight fractions were outside one or more of the upper and lower limits as provided by the equations provided herein. In Table 2, weight fractions marked with an asterisk (*) are outside the desired range. Consequently, samples of solid surface molded from the compositions Comparison Examples A-D did not have acceptable surface characteristics, those samples either having objectionable surface voids or a crumbly and grainy unstable surface, or both.

Additionally, Table 3 further illustrates that acceptable solid surface material and articles can be made wherein the majority of the material is recycled material. The data amounts of Table 1 were combined, with the recycled material being the combined amounts of ground solid surface primary particles, ground solid surface secondary particles, and optional solid surface dust particles. The filler and additives were also combined. As shown in Table 3, Examples 1, 3, & 4, which all made acceptable solid surfaces, were all made from a combination of ground solid surface primary particles, ground solid surface secondary particles, and optional solid surface dust particles, and the combined amounts were greater than 50 weight percent of the composition.

TABLE 3

| | Weight Percent | | | | | | | |
|---|---|---|---|---|---|---|---|---|
| Component | 1 | 2 | 3 | 4 | A | B | C | D |
| UPE | 20 | 20 | 20 | 20 | 20 | 17 | 20 | 13 |
| Recycled Material Particles | 56.3 | 45.5 | 52 | 67.8 | 63 | 70.8 | 67.8 | 63.3 |
| Filler & Additives | 23.7 | 34.5 | 28 | 12.2 | 17 | 12.2 | 12.2 | 23.7 |

The invention claimed is:

1. A composition suitable for making a solid surface material or article, comprising:

a) 15 to 25 weight percent ($X_R$) of unsaturated polyester resin, b) 15 to 50 weight percent ($X_A$) ground solid surface primary particles having a particle size that can pass through a mesh screen having 4.76 mm openings but not through a mesh screen having 0.150 mm openings, wherein at least 70 weight percent of the ground solid surface primary particles will not pass through a mesh screen having 0.60 mm openings, and c) 30 to 70 weight percent ($X_B$) of fine particles, wherein the c) particles include:

i) 2 to 25 weight percent ($X_C$) ground solid surface secondary particles having a particle size that can pass through a mesh screen having 0.60 mm openings but not through a mesh screen size having 0.075 mm openings, wherein at least 90 weight percent of the ground solid surface secondary particles will not pass through a mesh screen having 0.105 mm openings, ii) 5 to 35 weight percent ($X_F$) of inorganic filler particles, and iii) 0 to 23 weight percent ($X_D$) solid surface dust particles having a particle size that can pass through a mesh screen having 0.150 mm openings, wherein at least 60 weight percent of the solid surface dust particles will also pass through a mesh screen having 0.105 mm openings;

wherein the lower limit of weight percent ($X_C$) ground solid surface secondary particles is further represented by the expression:

$$-0.40X_R + 0.11 + \frac{(0.30X_R + 0.01)}{1 + e^{-[(X_B - 1.40X_R - 0.25)/(0.04X_R + 0.004)]}}$$

and the upper limit of weight percent ($X_C$) ground solid surface secondary particles is further represented by the expression:

$$0.20X_R + 0.05 + \frac{(1.7X_R - 0.195)}{1 + e^{-[(X_B + 2.60X_R - 0.85)/(0.60X_R - 0.08)]}},$$

wherein the lower limit of weight percent ($X_F$) of inorganic filler particles is further represented by the expression:

$$-0.40X_R + 0.13 + \frac{(X_R + 0.10)}{1 + e^{-[(X_B - 3.60X_R + 0.21)/(-0.60X_R + 0.14)]}}$$

and the upper limit of weight percent ($X_F$) of inorganic filler particles is further represented by the expression:

$$0.3 + \frac{(-0.42X_R + 0.14)}{1 + e^{-[(X_B + 1.60X_R - 0.77)/(0.56X_R - 0.07)]}},$$

and wherein if solid surface dust particles are present, the lower limit of weight percent ($X_D$) solid surface dust particles is further represented by the expression:

$$\frac{(-0.84X_R + 0.168)}{1 + e^{-[(X_B - 0.38X_R - 0.39)/(0.01X_R)]}}$$

and the upper limit of weight percent ($X_D$) of solid surface dust particles is further represented by the expression:

$$4.36X_R - 0.62 + \frac{(-4.00X_R + 0.66)}{1 + e^{-[(X_B + 1.54X_R - 0.69)/(0.68X_R - 0.10)]}}.$$

2. The composition of claim 1, wherein the inorganic filler particles have a particle size that can pass through a mesh screen having 0.088 mm openings.

3. The composition of claim 1, wherein the inorganic filler is alumina trihydrate.

4. The composition of claim 1, wherein the combination of ground solid surface primary particles, ground solid surface secondary particles, and optional solid surface dust particles comprise greater than 50 weight percent of the composition.

5. The composition of claim 4, wherein the combination of ground solid surface primary particles, ground solid surface secondary particles, and solid surface dust particles comprise up to 85 weight percent of the composition.

6. A solid surface material or article comprising the composition of claim 1.

7. A method for making a solid surface material or article, comprising the steps of:

A) grinding a solid surface article to form a mixture of solid surface particles;

B) classifying the particles into a set of classified particles comprising

I) ground solid surface primary particles having a particle size that can pass through a mesh screen having 4.76 mm openings but not through a mesh screen having 0.150 mm openings, wherein at least 70 weight percent of the ground solid surface primary particles will not pass through a mesh screen having 0.60 mm openings, and II) ground solid surface secondary particles having a particle size that can pass through a mesh screen having 0.60 mm openings but not through a mesh screen size having 0.075 mm openings, wherein at least 90 weight percent of the ground solid surface secondary particles will not pass through a mesh screen having 0.105 mm openings;

C) combining liquid unsaturated polyester resin with particles chosen from the classified set of particles, along with inorganic filler particles, to form a composition for forming a solid surface article; and D) molding the composition into a solid surface article;

wherein the composition for making a solid surface article made in step C) comprises:

a) 15 to 25 weight percent ($X_R$) of unsaturated polyester resin, b) 15 to 50 weight percent ($X_A$) ground solid surface primary particles, and c) 30 to 70 weight percent ($X_B$) of fine particles wherein the c) particles include:

i) 2 to 20 weight percent ($X_C$) ground solid surface secondary particles, ii) 5 to 35 weight percent ($X_F$) of inorganic filler particles, and iii) 0 to 23 weight percent ($X_D$) solid surface dust particles having a particle size that can pass through a mesh screen having 0.150 mm openings, wherein at least 60 weight percent of the solid surface dust particles will also pass through a mesh screen having 0.105 mm openings;

wherein the lower limit of weight percent ($X_C$) ground solid surface secondary particles is further represented by the expression:

$$-0.40X_R+0.11+\frac{(0.30X_R+0.01)}{1+e^{-[(X_B-1.40X_R-0.25)/(0.04X_R+0.004)]}}$$

and the upper limit of weight percent ($X_C$) ground solid surface secondary particles is further represented by the expression:

$$0.20X_R+0.05+\frac{(1.7X_R-0.195)}{1+e^{-[(X_B+2.60X_R-0.85)/(0.60X_R-0.08)]}},$$

wherein the lower limit of weight percent ($X_F$) of inorganic filler particles is further represented by the expression:

$$-0.40X_R+0.13+\frac{(X_R+0.10)}{1+e^{-[(X_B-3.60X_R+0.21)/(-0.60X_R+0.14)]}}$$

and the upper limit of weight percent ($X_F$) of inorganic filler particles is further represented by the expression:

$$0.3+\frac{(-0.42X_R+0.14)}{1+e^{-[(X_B+1.60X_R-0.77)/(0.56X_R-0.07)]}},$$

and wherein if solid surface dust particles are present, the lower limit of weight percent ($X_D$) solid surface dust particles is further represented by the expression:

$$\frac{(-0.84X_R+0.168)}{1+e^{-[(X_B-0.38X_R-0.39)/(0.01X_R)]}}$$

and the upper limit of weight percent ($X_D$) of solid surface dust particles is further represented by the expression:

$$4.36X_R-0.62+\frac{(-4.00X_R+0.66)}{1+e^{-[(X_B+1.54X_R-0.69)/(0.68X_R-0.10)]}}.$$

8. The method of claim 7 wherein step C) further includes combining solid surface dust particles in the composition for forming a solid surface article, the solid surface dust particles having a particle size that can pass through a mesh screen having 0.150 mm openings, wherein at least 60 weight percent of the solid surface dust particles will also pass through a mesh screen having 0.105 mm openings.

9. The method of claim 8 wherein the amounts of ground solid surface primary particles, ground solid surface secondary particles, and solid surface dust particles make up to 85 weight percent of the composition for forming a solid surface article.

10. The method of claim 7 wherein the composition for forming a solid surface contains 15 to 25 weight percent of the liquid polyester resin.

11. The method of claim 7 wherein 50 weight percent or greater of the composition for forming a solid surface article are particles chosen from the classified set of particles.

12. The method of claim 7, wherein the inorganic filler particles have a particle size that can pass through a mesh screen having 0.088 mm openings.

13. The method of claim 7, wherein the inorganic filler is alumina trihydrate.

14. The method of claim 7, wherein of the molding in step D) is conducted under heat and pressure.

15. The method of claim 14 comprising one or more steps of vibration and/or vacuum.

16. A solid surface material or article made by the method of claim 7.

* * * * *